United States Patent [19]

Suesada et al.

[11] Patent Number: 4,853,796
[45] Date of Patent: Aug. 1, 1989

[54] RECORDING/REPRODUCING APPARATUS FOR DIGITAL COMPOSITE VIDEO SIGNAL WITH MEANS FOR SYNCHRONIZING COLOR SUBCARRIER PHASE

[75] Inventors: Kunio Suesada, Ikoma; Toshiaki Koya, Osaka, both of Japan

[73] Assignee: Matsushita Electric Industrial Co., Ltd., Japan

[21] Appl. No.: 171,032

[22] Filed: Mar. 21, 1988

[30] Foreign Application Priority Data

Mar. 19, 1987 [JP] Japan ................... 62-64561

[51] Int. Cl.⁴ .................... H04N 5/76; H04N 9/79
[52] U.S. Cl. .................... 358/324; 358/17; 358/13
[58] Field of Search .................... 358/17-19, 358/319, 324-320, 325, 326

[56] References Cited

U.S. PATENT DOCUMENTS 3,969,758  7/1976  Okey .................... 358/319
4,670,796  6/1987  Kobayashi et al. .................... 358/310

FOREIGN PATENT DOCUMENTS 60-220694  11/1985  Japan .

Primary Examiner—Robert L. Richardson
Attorney, Agent, or Firm—Lowe, Price, LeBlanc, Becker & Shur

[57] ABSTRACT

In a recording/reproducing apparatus for digital composite video signal, a phase sync circuit (110) for synchronizing color subcarrer phases, a sync/ID adding circuit (9), a sync/ID detecting circuit (12), a memory control circuit (13), a memory (14), and a phase relocating circuit (111), are provided for obtaining correct hues of the digital composite video signal when high-speed reproducing. When high-speed reproducing, the memory control circuit (13) is operated such that corresponding sampled signals in the memory (14) are stored as the same address with the same color subcarrier phase. As a result, a high image quality is achieved by the recording/reproducing apparatus even when high-speed reproducing with low manufacturing cost.

24 Claims, 22 Drawing Sheets

| FIELD NO.   | 0 | 1 | 2 | 3 |
|---|---|---|---|---|
| RECODING    | 2 | 2 | 0 | 0 |
| REPRODUCING | 0 | 0 | 2 | 2 |

| FIELD NO.   | 0 | 1 | 2 | 3 | 4 | 5 | 6 | 7 |
|---|---|---|---|---|---|---|---|---|
| RECODING    | 2 | 0 | 1 | 3 | 0 | 2 | 3 | 1 |
| REPRODUCING | 1 | 3 | 2 | 0 | 3 | 1 | 0 | 2 |

| FIELD NO. | | 0 , 1 | | | | 2 , 3 | | |
|---|---|---|---|---|---|---|---|---|
| SAMPLE | | n | n+1 | n+2 | n+3 | n | n+1 | n+2 | n+3 |
| LINE | m' | 270 | 0 | 90 | 180 | 90 | 180 | 270 | 0 |
| | m | 270 | 0 | 90 | 180 | 90 | 180 | 270 | 0 |
| | m'+1 | 90 | 180 | 270 | 0 | 270 | 0 | 90 | 180 |
| | m+1 | 90 | 180 | 270 | 0 | 270 | 0 | 90 | 180 |
| | m'+2 | 270 | 0 | 90 | 180 | 90 | 180 | 270 | 0 |
| | m+2 | 270 | 0 | 90 | 180 | 90 | 180 | 270 | 0 |
| | m'+3 | 90 | 180 | 270 | 0 | 270 | 0 | 90 | 180 |
| | m+3 | 90 | 180 | 270 | 0 | 270 | 0 | 90 | 180 |
| | m'+4 | 270 | 0 | 90 | 180 | 90 | 180 | 270 | 0 | m' = m + 262

FIG. 13

| METHOD | A | | | | B | | | |
|---|---|---|---|---|---|---|---|---|
| SAMPLE | n | n+1 | n+2 | n+3 | n | n+1 | n+2 | n+3 |
| LINE m' |  | 1 |  | 3 |  | 1 |  | 3 |
| m |  | 0 |  | 2 |  | 0 |  | 2 |
| m'+1 |  | 3 |  | 1 |  | 3 |  | 1 |
| m+1 |  | 2 |  | 0 |  | 2 |  | 0 |
| m'+2 |  | 1 |  | 3 |  | 1 |  | 3 |
| m+2 |  | 0 |  | 2 |  | 0 |  | 2 |
| m'+3 |  | 3 |  | 1 |  | 3 |  | 1 |
| m+3 |  | 2 |  | 0 |  | 2 |  | 0 |
| m'+4 |  | 1 |  | 3 |  | 1 |  | 3 | m' = m + 262

FIG. 14

| FIELD NO. | 0, 1 | | | | 2, 3 | | | | 4, 5 | | | | 6, 7 | | | |
|---|---|---|---|---|---|---|---|---|---|---|---|---|---|---|---|---|
| SAMPLE | n | n+1 | n+2 | n+3 | n | n+1 | n+2 | n+3 | n | n+1 | n+2 | n+3 | n | n+1 | n+2 | n+3 |
| LINE m | 90 | 180 | 270 | 0 | 0 | 90 | 180 | 270 | 270 | 0 | 90 | 180 | 180 | 270 | 0 | 90 |
| m' | 180 | 270 | 0 | 90 | 90 | 180 | 270 | 0 | 0 | 90 | 180 | 270 | 270 | 0 | 90 | 180 |
| m+1 | 0 | 90 | 180 | 270 | 270 | 0 | 90 | 180 | 180 | 270 | 0 | 90 | 90 | 180 | 270 | 0 |
| m'+1 | 90 | 180 | 270 | 0 | 0 | 90 | 180 | 270 | 270 | 0 | 90 | 180 | 180 | 270 | 0 | 90 |
| m+2 | 270 | 0 | 90 | 180 | 180 | 270 | 0 | 90 | 90 | 180 | 270 | 0 | 0 | 90 | 180 | 270 |
| m'+2 | 0 | 90 | 180 | 270 | 270 | 0 | 90 | 180 | 180 | 270 | 0 | 90 | 90 | 180 | 270 | 0 |
| m+3 | 180 | 270 | 0 | 90 | 90 | 180 | 270 | 0 | 0 | 90 | 180 | 270 | 270 | 0 | 90 | 180 |
| m'+3 | 270 | 0 | 90 | 180 | 180 | 270 | 0 | 90 | 90 | 180 | 270 | 0 | 0 | 90 | 180 | 270 |
| m+4 | 90 | 180 | 270 | 0 | 0 | 90 | 180 | 270 | 270 | 0 | 90 | 180 | 180 | 270 | 0 | 90 | m' = m + 313

FIG. 15

| FIELD NO. | A' | | | | B' | | | | C' | | | | D' | | | |
|---|---|---|---|---|---|---|---|---|---|---|---|---|---|---|---|---|
| SAMPLE | n | n+1 | n+2 | n+3 | n | n+1 | n+2 | n+3 | n | n+1 | n+2 | n+3 | n | n+1 | n+2 | n+3 |
| LINE  m | 2 | 4 | 6 | 0 | 2 | 4 | 6 | 0 | 2 | 4 | 6 | 0 | 2 | 4 | 6 | 0 |
| m' | 5 | 7 | 1 | 3 | 5 | 7 | 1 | 3 | 5 | 7 | 1 | 3 | 5 | 7 | 1 | 3 |
| m+1 | 0 | 2 | 4 | 6 | 0 | 2 | 4 | 6 | 0 | 2 | 4 | 6 | 0 | 2 | 4 | 6 |
| m'+1 | 3 | 5 | 7 | 1 | 3 | 5 | 7 | 1 | 3 | 5 | 7 | 1 | 3 | 5 | 7 | 1 |
| m+2 | 6 | 0 | 2 | 4 | 6 | 0 | 2 | 4 | 6 | 0 | 2 | 4 | 6 | 0 | 2 | 4 |
| m'+2 | 1 | 3 | 5 | 7 | 1 | 3 | 5 | 7 | 1 | 3 | 5 | 7 | 1 | 3 | 5 | 7 |
| m+3 | 4 | 6 | 0 | 2 | 4 | 6 | 0 | 2 | 4 | 6 | 0 | 2 | 4 | 6 | 0 | 2 |
| m'+3 | 7 | 1 | 3 | 5 | 7 | 1 | 3 | 5 | 7 | 1 | 3 | 5 | 7 | 1 | 3 | 5 |
| m+4 | 2 | 4 | 6 | 0 | 2 | 4 | 6 | 0 | 2 | 4 | 6 | 0 | 2 | 4 | 6 | 0 |

BLOCK NO.

| 0 | 0 | 1 | 2 | 3 | ----- |
| 1 | 1024 | 1025 | 1026 | 1027 | ----- |
| 2 | 2048 | 2049 | 2050 | 2051 | ----- |
| 3 | 3072 | 3073 | 3074 | 3075 | ----- |

FIG. 20

| | BLOCK NO. | 0 | 1 | 2 | 3 | ----- |
|---|---|---|---|---|---|---|
| TOP ADD. | FIELD 0,1 | 2 | 1026 | 2050 | 3074 | ----- |
| | FIELD 2,3 | 0 | 1024 | 2048 | 3072 | ----- |

FIG. 21

| | BLOCK NO. | 0 | 1 | 2 | 3 | ----- |
|---|---|---|---|---|---|---|
| TOP ADD. | FIELD 0,5 | 2 | 1026 | 2050 | 3074 | ----- |
| | FIELD 1,4 | 0 | 1024 | 2048 | 3072 | ----- |
| | FIELD 2,7 | 1 | 1025 | 2049 | 3073 | ----- |
| | FIELD 3,6 | 3 | 1027 | 2051 | 3075 | ----- |

| MODE CONTROL | 0 | 1 | | | |
|---|---|---|---|---|---|
| FIELD NO. | — | 0 | 1 | 2 | 3 |
| DECODE VALUE | — | 0 | 0 | 1 | 1 |

| MODE CONTROL | 0 | | | | 1 |
|---|---|---|---|---|---|
| FIELD NO. | 0 | 1 | 2 | 3 | — |
| DECODED VALUE | 0 | 0 | 2 | 2 | 0 |

| MODE CONTROL | 0 | | | | | | | | 1 |
|---|---|---|---|---|---|---|---|---|---|
| FIELD NO. | 0 | 1 | 2 | 3 | 4 | 5 | 6 | 7 | — |
| DECODED VALUE | 1 | 3 | 2 | 0 | 3 | 1 | 0 | 2 | 0 |

| FIELD NO. | 0 | 1 | 2 | 3 |
|---|---|---|---|---|
| RECODING | -2 | -2 | 0 | 0 |
| REPRODUCING | 0 | 0 | -2 | -2 |

| FIELD NO. | 0 | 1 | 2 | 3 | 4 | 5 | 6 | 7 |
|---|---|---|---|---|---|---|---|---|
| RECODING | -2 | 0 | -1 | -3 | 0 | -2 | -3 | -1 |
| REPRODUCING | -1 | -3 | -2 | 0 | -3 | -1 | 0 | -2 |

RECORDING/REPRODUCING APPARATUS FOR DIGITAL COMPOSITE VIDEO SIGNAL WITH MEANS FOR SYNCHRONIZING COLOR SUBCARRIER PHASE

BACKGROUND OF THE INVENTION

1. Field of the Invention

This invention relates generally to recording/reproducing apparatus, and particularly to video tape recorders for digital composite video signal.

2. Prior Art

Usually, a digital composite video signal includes color subcarrier. When such a digital composite video signal is reproduced from a recording media at a high-speed, a resultant reproduced signal of one field includes various signal components different fields. in a conventional video tape recorder, since the color subcarrier phase changes in every field, correct hues of VTR cannot be provided by such a digital composite video signal for high-speed reproducing. One example of high-speed reproducing method is shown in a Japanese Laid-Open Patent Application No. 60-220694. In this application, the first color subcarrier phase of each recorded line is synchronized with each other. Therefore, field numbers have constant relation to reproduced color subcarrier phase whereby the hues of images can be correctly obtained any time. However, since recording signals in four lines are reproduced as one line, the quality of images are largely deteriorated in the vertical direction. Furthermore, although 251 lines must be recorded on magnetic tape, since only 250 lines are allowed for recording, one line is in vain in NTSC system. In addition, in PAL system using eight field sequence, since eight lines are reproduced as one line, the deterioration of an image quality become larger, and three lines thereof are in vain.

SUMMARY OF THE INVENTION

The present invention has been developed in order to remove the above-described drawbacks inherent to the conventional recording/reproducing apparatus.

It is, therefore, an object of the present invention to provide a new and useful recording/reproducing apparatus for digital composite video signal.

It is another object of the invention to provide a recording/reproducing apparatus having a strong image colleration.

It is a further object of the invention to provide a recording/reproducing apparatus in which correct hues are obtained even when high-speed reproducing.

In accordance with the present invention there is provided a recoding/reproducing apparatus for digital composite video signal, comprising: an analog-to-digital converter for converting an analog composite video signal into a digital composite video signal; a phase sync circuit means for synchronizing color subcarrier phases in the digital composite video signal such that the position of the first sample of a digital active line in every field is shifted at most two samples in the horizontal direction in the NTSC system and at most four samples in horizontal direction in the PAL system; a sync/ID adding circuit means for adding a sync pattern and a ID pattern to a sample signal indicative of an output signal from the phase sync circuit means, and for producing a sync block having the sync pattern, the ID pattern, and the sample signal; a recording circuit means for recording the sync block on a recording medium; a reproducing circuit means for reproducing the sync block from the recording medium; a sync/ID detecting circuit means for detecting the sync pattern and the ID pattern in the sync block, and for producing a block distinguishing signal and a block period signal, as well as the sample signal; a memory control circuit means for producing an address signal in accordance with the block distinguishing signal and the block period signal; a memory means for storing the sample signal in accordance with the address signal, and for ouputting the sample signal; a phase relocating circuit means for obtaining a second digital composite video signal from the sample signal from the memory means; and a digital-to-analog converter for converting the second digital composite video signal into a second analog composite video signal.

In accordance with the present invention there is also provided a recoding/reproducing apparatus for digital composite video signal, comprising: an analog-to-digital converter for converting an analog composite video signal into a digital composite video signal; a first sync separator/timing generator circuit means for separation a sync signal, a burst signal, and a frame signal from the analog composite video signal and for generating timing signals; a sync/ID adding circuit means for adding a sync pattern and a ID pattern to a sample signal indicative of an output signal from the analog-to-digital converter, and for producing a sync block having the sync pattern, the ID pattern, and the sample signal; a recording circuit means for recording the sync block on a recording medium; a reproducing circuit means for reproducing the sync block from the recording medium; a sync/ID detecting circuit means for detecting the sync pattern and the ID pattern in the sync block, and for producing a block distinguishing signal, a field distinguishing signal, and a block period signal; as well as the sample signal; a memory control circuit means for producing an address signal in accordance with the block distinguishing signal, the field distinguishing signal, and the block period signal, and for synchronizing color subcarrier phases in the digital composite video signal such that the position of the first sample of a digital active line in every field is shifted at most two samples in the horizontal direction in the NTSC system and at most four samples in horizontal direction in the PAL system; a memory means for storing the sample signal in accordance with the address signal, and for outputting the sample signal; a second sync separator/timing generator circuit means for obtaining a second digital composite video signal from the sample signal from the memory means; and a digital-to-analog converter for converting the second digital composite video signal into a second analog composite video signal.

In accordance with the present invention there is further provided a recoding/reproducing apparatus for digital composite video signal, comprising: an analog-to-digital converter for converting an analog composite video signal into a digital composite video signal; a first sync separator/timing generator circuit means for separation a sync signal, a burst signal, and a frame signal from the analog composite video signal to generate timing signals, and for synchronizing color subcarrier phases in the digital composite video signal such that the position of the first sample of a digital active line in every field is shifted at most two samples in the horizontal direction in the NTSC system and at most four samples in horizontal direction in the PAL system; a sync-/ID adding circuit means for adding a sync pattern and a ID pattern to a sample signal indicative of output signal from the analog-to-digital converter and for producing a sync block having the sync pattern, the ID pattern, and the sample signal in accordance with the timing signals from the first sync separator/timing generator circuit means; a recording circuit means for recording the sync block on a recording medium; a reproducing circuit means for reproducing the sync block from the recording medium; a sync/ID detecting circuit means for detecting the sync pattern and the ID pattern in the sync block, and for producing a block distinguishing signal, a field distinguishing signal, and a block period signal, as well as the sample signal, a memory control circuit means for producing an address signal in accordance with the block distinguishing signal and the block period signal; a memory means for storing the sample signal in accordance with the address signal, and for outputting the sample signal; a second sync separator/timing generator circuit means for obtaining a second digital composite video signal from the sample signal from the memory means; and a digital-to-analog converter for converting the second digital composite video signal into a second analog composite video signal.

BRIEF DESCRIPTION OF THE DRAWINGS

The object and features of the present invention will become more readily apparent from the following detailed description of the preferred embodiments taken in conjunction with the accompanying drawings in which:

FIG. 13 is a table showing field numbers in which sample phase is 0° according to FIG. 12;

FIG. 14 is a table showing color subcarrier phases in a PAL digital composite video signal sampled by the 4Fsc-clock pulses;

FIG. 15 is a table showing field numbers in which the sample phase is 0° according to FIG. 14;

FIG. 19 is a table showing an input-output relation according to the memory control circuit used in the first embodiment of FIG. 1;

FIG. 20 is a table showing an input-output relation in the NTSC system according to the memory control circuit used in the second embodiment of FIG. 16;

FIG. 21 is a table showing an input-output relation in the PAL system according to the memory control circuit used in the second embodiment of FIG. 16;

The same or corresponding elements and parts are designated at like reference numerals throughout the drawings.

DETAILED DESCRIPTION OF THE INVENTION

Prior to describing the preferred embodiments of the present invention, the above-mentioned conventional recording/reproducing apparatus for digital composite video signal will be described for a better understanding of the present invention.

Figure 38:
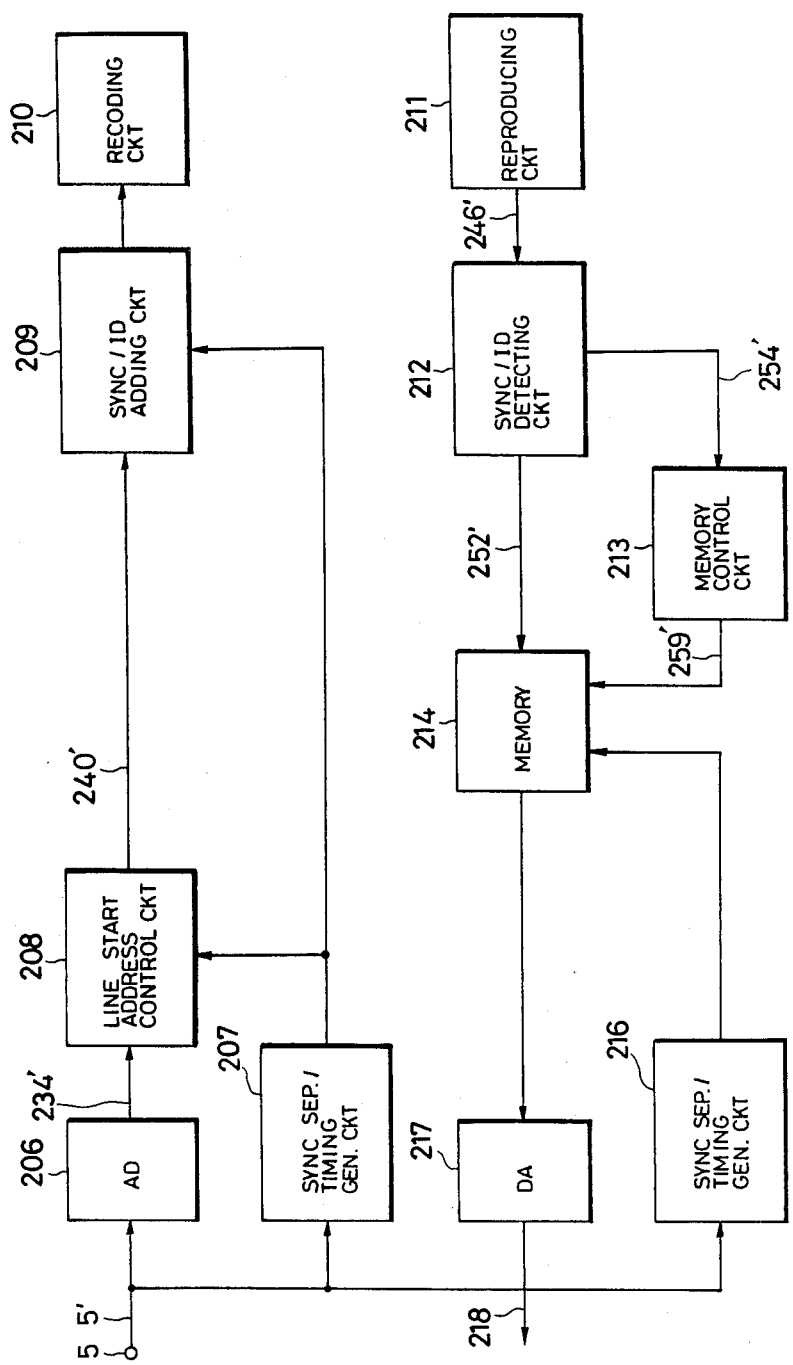
FIG. 38 is a block diagram showing a conventional recording/reproducing apparatus for digital composite video signal.

FIG. 38 shows a block diagram of a conventional recording/reproducing apparatus for digital composite video signal. Analog composite video signal 5' is converted into digital composite video signal 234' in an analog-to-digital converter (AD converter) 206. Output signal from the AD converter 206, i.e. samples for digital composite video signal are fed to a line start address control circuit 208. The analog composite video signal 5' is also inputted into the sinc separator/timing generator circuit 207 for obtaining required signals from burst and sync signals and so on. The output digital signal 246' from the reproducing circuit 211 is sent to a sync-/ID detecting circuit 212 for generating a memory control timing signal 254'. A memory control circuit 213 outputs a desired address signal 259' to a memory 214 in accordance with the timing control signal 254'. An outputted signal 252' outputted from the sync/ID detecting circuit 212 is sent, via the memory 214, to a digital-to-analog converter 217.

Figure 22:
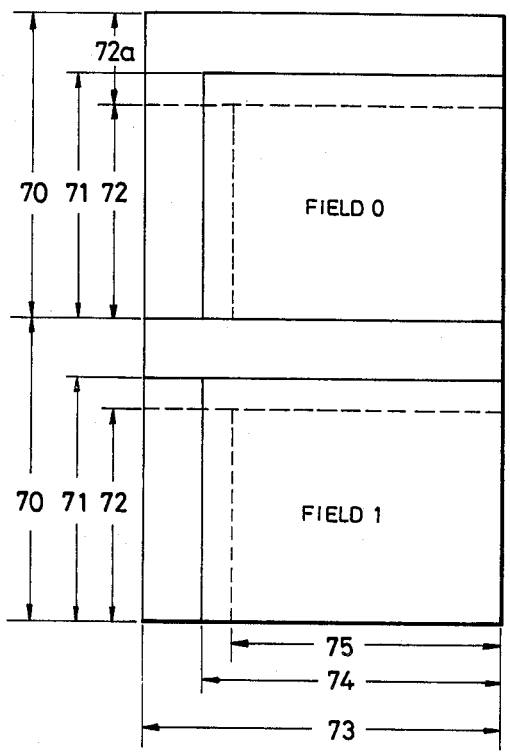
FIG. 22 shows a spatial representation of a frame having two fields.

Generally, composite video signal includes color subcarrier. One color frame is formed of 4 fields in NTSC system, and is formed of 8 fields in PAL system. With reference to FIG. 22 showing two fields which are to be recorded on a magnetic tape with the NTSC system, a frame 0 is formed of a field 0 and a field 1, and each field in the frame 0 has 262.5 lines 70. Here, numbers 0, 1, 2, ... used as field 0, field 1, frame 0, ... show distinguishing numbers throughout the specification. The lines 70 consist of lines 72a correspond to lines for field blanking and another lines 72. The period of each line length shown by a reference numeral 73 is approximately 6.4 μsec. The line 73 consist of blanking time period 75a and other time period 75. In the digital VTRs, lines 71 including the lines 72 are used as recorded lines, and such lines each defined by at time period 74 including a time period 75 is used as digital active lines. More specifically, the recording and reproducing of a digital VTR is performed by digital-processing samples in each of the digital active lines.

Figure 23:
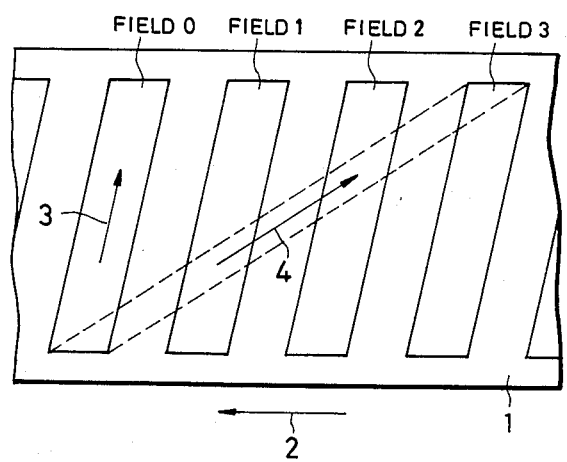
FIG. 23 shows loci of a general digital VTR head on a magnetic tape.

FIG. 23 shows general loci of a digital VTR head on a magnetic tape. The magnetic tape 1 moves in the direction of arrow 2 with nomal speed. When the head (not shown) is shifted in the direction of arrow 3, recording portions are formed as parallelogram tracks shown in FIG. 23. Assuming a format in which one field video signal is recorded as one track on the tape 1, a field 0, a field 1, a field 2, a field 3, ... are recorded on each track respectively. When such a recorded tape 1 is used for reproducing at a speed four times higher than the nomal speed, the locus of the head is shifted in the direction of arrow 4, and is shown by one-dot line parallelogram track as shown in FIG. 23. At this time, images reproduced from one field video signal is resulted from samples in the fields 0–3.

Figures 24, 25:
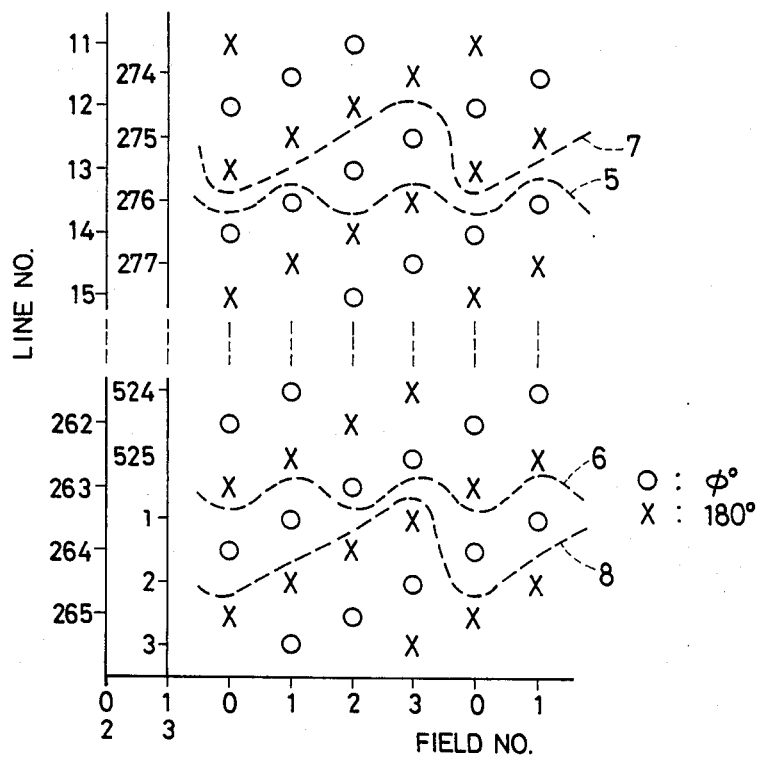
FIG. 24 is a graph showing color subcarrier phases changed by a relation between line numbers and field numbers.
FIG. 25 is a table showing the line numbers which is to be defined to obtain the same color subcarrier phase according to FIG. 24.

FIG. 24 is a graph showing color subcarrier phases changed by a relation between line numbers and field numbers. Longitudinal scale lines represent line numbers in one frame according to NTSC system, and the line numbers are classified into of fields 0 and 2, and of fields 1 and 3. A horizontal scale line represents field numbers, and this field numbers are sequence of the fields 0–3 because the NTSC system has a four field sequence. In FIG. 24, references "o" and "x" represent the phase of color subcarrier in each line and in each field, and respectively represent phase of 0° and 180°.

In digital VTRs, one example of a recording method using component video signal will be described as a method 1. Assuming that 250 lines are used as one field, and that the line numbers of the recorded lines are defined by one-dot lines 5 and 6, the line numbers are as shown in "method 1" of a table of FIG. 25. In this method 1, since the component video signal is used, color reproduced video signal is commonly obtained without special devices even when the above-mentioned four times speedy reproducing is executed by the samples obtained from the fields 0–3 as one field. However, in the case that composite video signal is used in such a digital VTR, since the phase of color subcarrier in the composite video signal is changed as shown in FIG. 24, if the four times speedy reprodicing is executed, such reproduced composite video signal includes two kinds color subcarrier phases. As a result, there is a disadvantage that the hue of images cannot correctly provided.

Meanwhile, the other example of the recording method will be described as a method 2. The method 2 is applied to the above-mentioned conventional recording/reproducing apparatus. In this method 2, it is assumed that the line numbers of recorded lines are defined by one-dot lines 7 and 8 in FIG. 24. It is to be noted that the position of the first sample on the digital active line in every field is defined in every line. More specifically, a start address of every field signal is adding to the line signal having the same color subcarrier phase. The line numbers determined by the method 2 are also shown in "method 2" of the table of FIG. 25. In the method 2, the speedy reproducing is performed by uniforming each first phase of color subcarrier in the recorded lines. Therefore, the field numbers have no relation with the reproduced color subcarrier phase whereby common speedy images can be obtained.

However, there are at least two disadvantages in this method 2. Firstly, in the four times speedy reproducing, since four lines are reproduced as one line, the quality of images are largely deteriorated in the vertical direction. Secondly, although 251 lines must be recorded on magnetic tape, since only 250 lines are allowed for recording, one line is in vain. Furthermore, in PAL system using eight field sequence, since eight lines are reproduced as one line, the deterioration of an image quality become larger, and three lines thereof are in vain.

Figure 1:
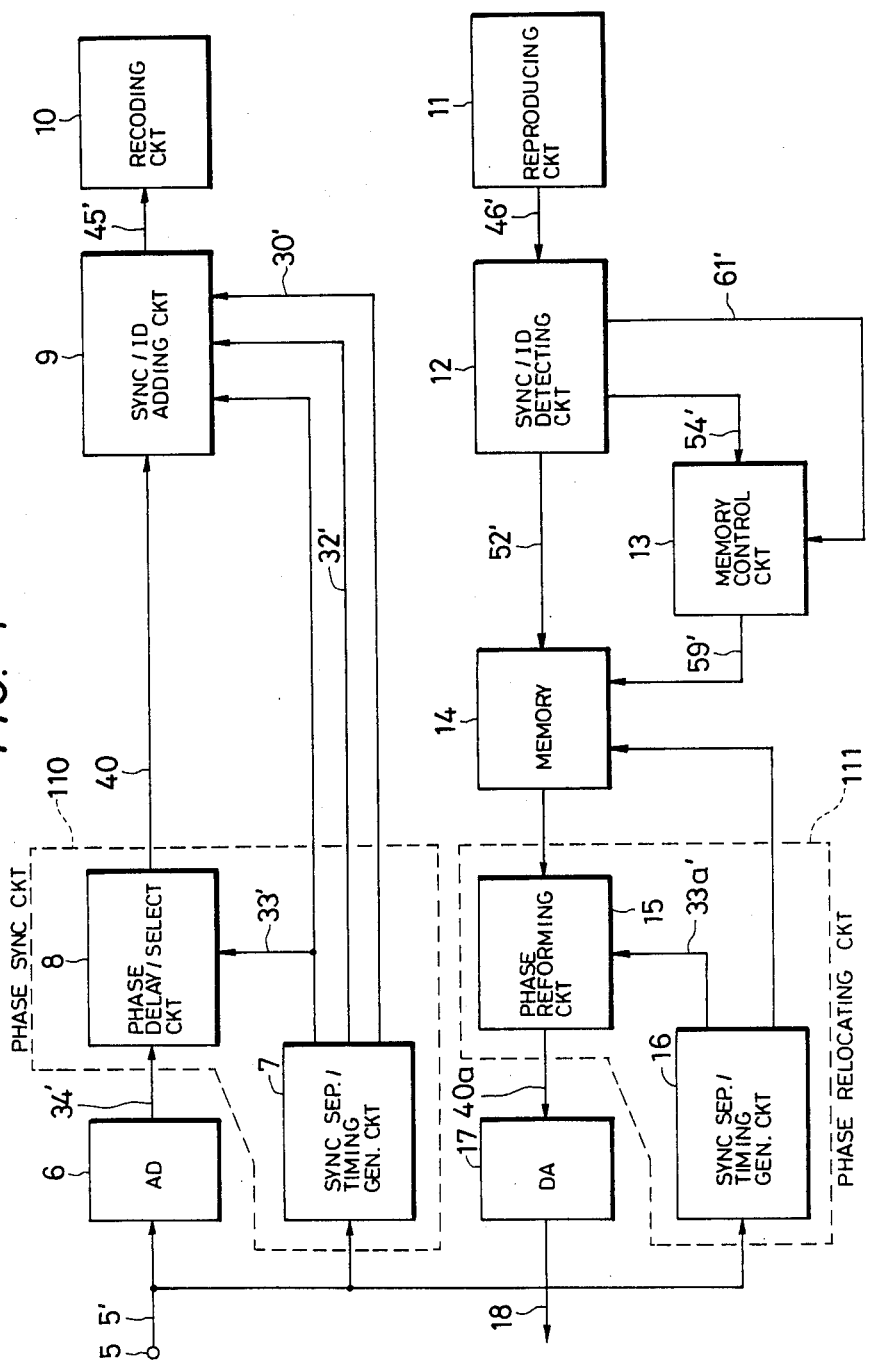
FIG. 1 shows a block diagram of a recording/reproducing apparatus for digital composite video signal according to a first embodiment of the present invention.

FIG. 1 shows a block diagram of a recording/reproducing apparatus for digital composite video signal according to a first embodiment of the present invention. Analog composite video signal 5' inputted from a terminal 5 is converted into digital composite video signal 34' in an analog-to-digital converter (AD converter) 6. Output signal from the AD converter 6, i.e. samples for digital composite video signal are sent to a phase sync circuit 110 having a sinc separator/timing generator circuit 7 and a phase delay/select circuit 8 which will be discribed hereinafter. The analog composite video signal 5' is also inputted into the sinc separator/timing generator circuit 7 for obtaining required signals from burst and sync signals.

Figure 2:
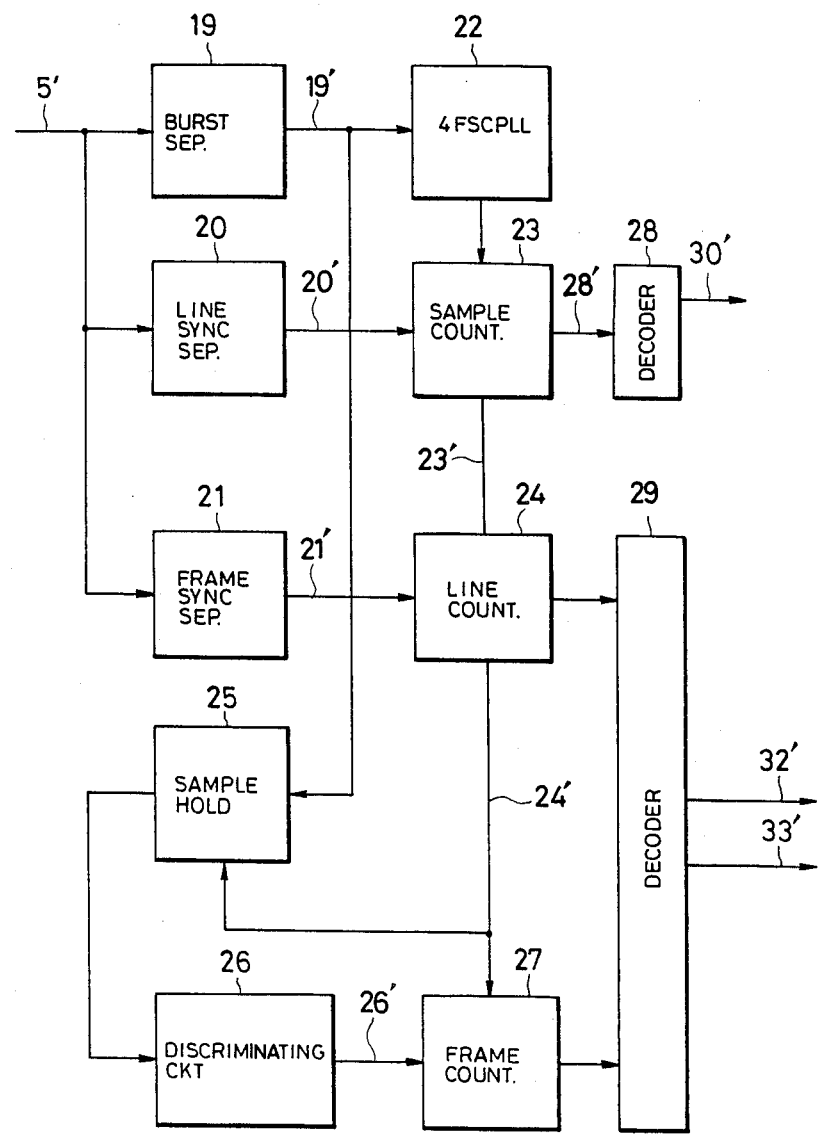
FIG. 2 shows a block diagram of one sinc separator/timing generator circuit used in the first embodiment of FIG. 1.

FIG. 2 shows a block diagram of the sinc separator/timing generator circuit 7. The digital composite video signal 5' is sent to a burst separator circuit 19, a line sync separator circuit 20, and a frame sync separator 21 to respectively separate a color burst signal, a line sync signal, and a frame sync signal. The burst separator circuit 19, the line sync separator circuit 20, and the frame sync separator circuit 21 are respectively output a burst period signal 19', a line sync period signal 20', and a frame period signal 21'. The burst period signal 19', the line sync period signal 20', and the frame period signal 21' are respectively sent to a 4Fsc-PLL circuit 22, a sample count circuit 23, and a line count circuit 24. In the 4Fsc-PLL circuit 22, 4Fsc-clock having four times speedy period than the color subcarrier is obtained on the basis of the burst period signal 19', and is applied to each circuit in the present apparatus. In the sample count circuit 23, an initial value is loaded by the line sync period signal 20' therein. The 4Fsc-clock is counted in the sample count circuit 23, and sample numbers in one line are defined. A sample number 28' is sent to a decoder 28 which is formed of a read only memory (ROM) with register for producing timing signals 30'. In the line count circuit 24, an initial value is loaded by the frame period signal 21' therein, and line numbers in one frame are defined by counting line sync period signal 23' from the sample count circuit 23.

The burst period signal 19' from the burst separator circuit 19 is also sent to a sample and hold circuit 25, and is sampled and held in accordance with frame period signal 24' from the line count circuit 24. The output signal from the sample and hold circuit 25 assumes a values such as positive value, zero, and negative value according to the burst phase. Then the output signal from the sample and hold circuit 25 is sent to a discriminating circuit 26, and is determined the state of the value. The discriminating circuit 26 is easily produced by a comparator using operational amplifiers. When the value is positive, a load signal 26' is applied to a frame count circuit 27 from the discriminating circuit 26. In the frame count circuit 27, an initial value is loaded by a load signal from the discriminating circuit 26, and frame numbers in one color frame are defined by counting the frame period signal 24' from the line count circuit 24. The output signals from the line count circuit 24 and the frame count circuit 27 are decoded in the decoder 29 which is formed of ROM with register for producing a block number signal 32' indicative of a block distinguishing signal and a field number signal 33' indicative of a field distinguishing signal.

Figures 3, 4, 5:
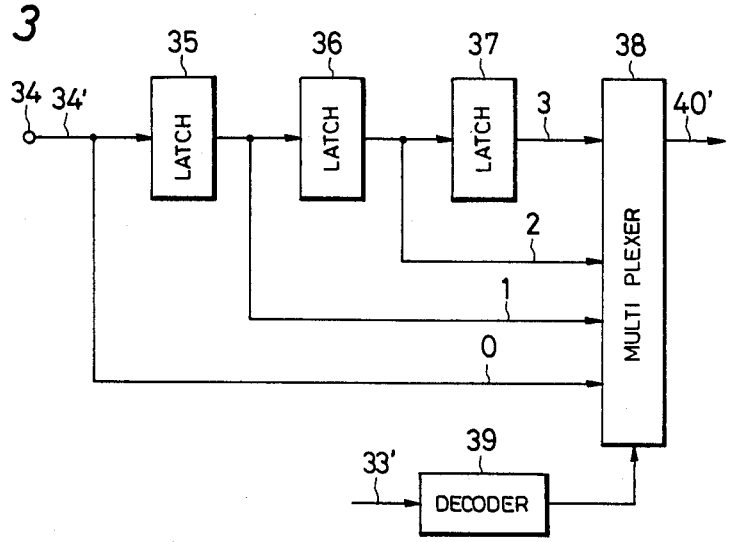
FIG. 3 shows a block diagram of a phase delay/select circuit used in the first embodiment.
FIG. 4 is a table showing input-output relations by NTSC system in a decoder used in FIG. 3.
FIG. 5 is a table showing input-output relations by PAL system in the decoder used in FIG. 3.

Next, the above-mentioned phase delay/select circuit 8 will be described hereinbelow with reference to FIG. 3. FIG. 3 shows a block diagram of a phase delay/select circuit 8 according to the present invention. The phase delay/select circuit 8 includes three latching circuits 35, 36, and 37 which operate with the 4Fsc clock, a multiplexer 38 and a decoder 39. The output signal 34' from the AD convertor 6 is inputted into the terminal 34, and is successively latched and delayed every one sample time period by the three latching circuit 35, 36, and 37. The inputted signal 34' and the output signals from the latching circuit 33, 34, and 35 are respectively inputted to the multplexer 38 as input signals 0', 1', 2', and 3'.

Meanwhile, the field number signal 33' from the decoder 29 is decoded in the decoder 39, and is sent to the select terminals of the multiplexer 38. In the multiplexer 38, one of the input signals 0', 1', 2', and 3' is selected in accordance with the output signal from the decoder 39, and is outputted as output signal 40' of the phase delay/select circuit 8. Input-output relations in the decoder 39 by the NTSC system and PAL system are respectively shown in each row of "recording" in tables of FIGS. 4 and 5, and numbers in the row show the corresponding signal numbers inputted into the multiplexer 38. For example, in the NTSC system, if the inputted field number is 0, the output signal when recording is selected as the signal 2 in the multiplexer 38.

Figure 6:
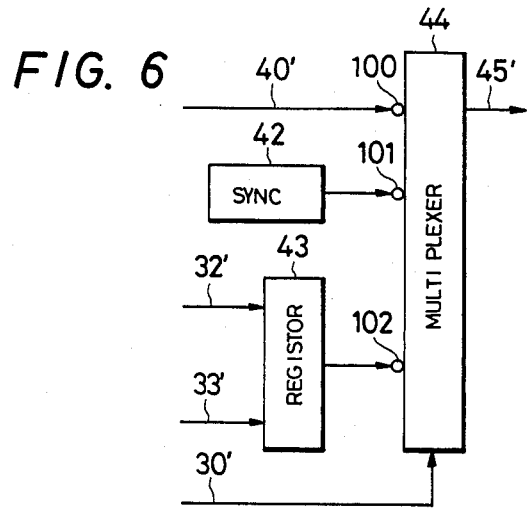
FIG. 6 is a block diagram of a sync /ID adding circuit according to the first embodiment.
Figure 7:
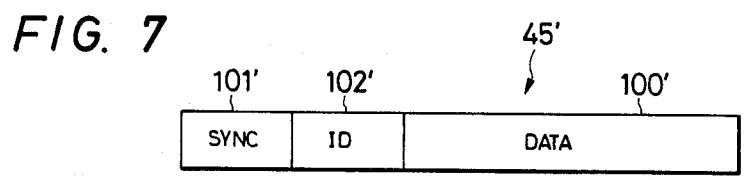
FIG. 7 shows a sync block produced in the sync/ID adding circuit of FIG. 6.

Turning to FIG. 1, the output signal 40' from the phase delay/select circuit 8 is sent to a sync/ID adding circuit 9. FIG. 6 is a block diagram of the sync/ID adding circuit 9 according to the present invention. The sync/ID adding circuit 9 includes a multiplexer 44, a sync circuit 42, and a register circuit 43, and the sync circuit formed of buffers. The register circuit 43 is a circuit for temporarily storing the outputted block number signal 32' and the outputted field number signal 33' from the decoder 29 to produce an identification (ID) pattern 102'. The sync circuit 42 produces a sync pattern 101'. The sync pattern 101', the ID pattern 102', and the signal 40' are respectively inputted into a terminal 101, a terminal 102, and a terminal 100 of the multiplexer 44. In the multiplexer 44, the input signals from the terminal 101, the terminal 102, the terminal 100 are selected in this sequence in accordance with the timing signal 30' from the decoder 28. As a result, a sync block 45' is produced by a period of the timing signal 30' as shown in FIG. 7. The sync block 45' is formed the sync pattern 101', the ID pattern 102', and a data portion 100' having a plurality of samples. In this case, the amount of samples is equal to the sample amount of one digital active line. With reference to FIG. 7, such sync blocks 45' are recorded on a recording medium by a recording circuit 10 which is easily produced by using a recording amplifier, a recording head, etc.

Referring to FIG. 1, the digital composite video signal recorded by way of the above-mentioned recording processes is reproduced in a reproducing circuit 11. The reproducing circuit 11 is easily produced by a reproducing amplifier, a clock reproducing circuit, etc.

Figure 8:
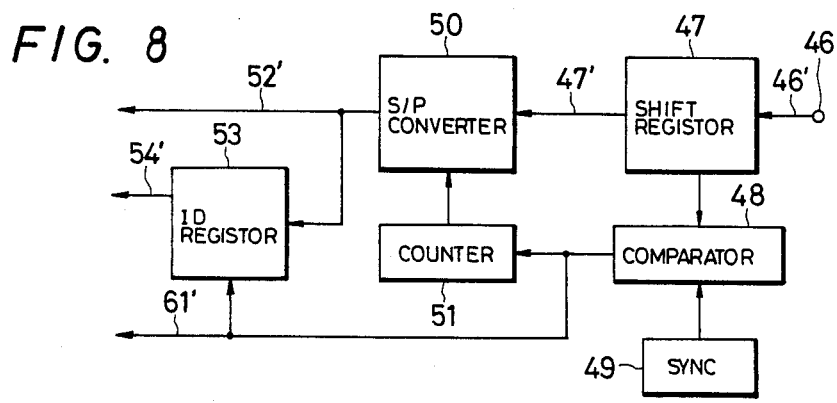
FIG. 8 is a block diagram of a sync/ID detecting circuit used in the first embodiment of FIG. 1.

The output digital signal 46' from the reproducing circuit 11 is sent to a sync/ID detecting circuit 12. A block diagram of the sync/ID detecting circuit 12 is shown in FIG. 8. The sync/ID detecting circuit 12 includes a shift register 47, a comparator 48, a sync circuit 49, a serial-to-parallel (S/P) converter 50, a counter 51 for counting clock pulses from the reproducing circuit 11, and a ID register 53. The input signal 46' inputted into a terminal 46 is sent to the shift register 47. The inputted digital signal 46' is shifted by one bit in the shift register 47, and is sent to the comparator 48. When the output signal 47' from the shift registor 47 and the sync circuit 49 are equal, the comparator 48 outputs a timing signal 61'. In this case, the signal 61' has a block period for clearing the data in the counter 51 which is an 8-bits counter. Bit-serial signal 47' outputted from the shift register 47 is converted into byte-serial signal 52' in the S/P converter 50 by 4Fsc-clock from the reproducing circuit 11 as the output signal from the counter 51. The block period signal 61' and the byte-serial signal 52' are sent to the ID register 53. In the ID register 53, the byte-serial signal 52' is contemporarily stored by a timing of the block period signal 61', and block number signal 54' and field number signal 55' are respectively outputted from the ID register 53.

Figure 9:
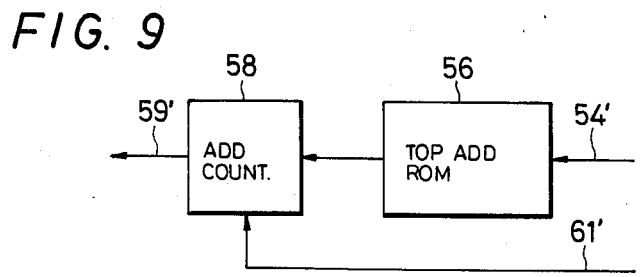
FIG. 9 is a block diagram of a memory control circuit used in the first embodiment of FIG. 1.

Turning to FIG. 1, the block number signal 54' and the block period timing signal 61' are inputted into a memory control circuit 13. FIG. 9 illustrates a block diagram of the memory control circuit 13 including a top address ROM 56 and an address counter 58. In the top address ROM 56, a top address corresponding to each block number of the block number signal 54' is obtained, and is loaded to the address counter 58 by a timing of the block period signal 61'. The relation between the block number and the top address is shown in a table of FIG. 19. For example, the top address of a block 1 is 1024, and the top address of a block 2 is 2048. Thus, each block has addresses of 1k, i.e. each block number corresponds to each recorded line number. In this case, an input-output relation in the top address ROM 56 is as follows. When the input signals are 0, 1, 2, . . . , the output signals are respectively 0, 1024, 2048, . . . , and this relation is independent from the field numbers. Thus, the address counter 58 outputs such addresses to the memory 14 in accordance with the relation showing in FIG. 19. Therefore, in the memory 14, the output signal 52' of the sync/ID detecting circuit 12 is stored every block in the addresses obtained from the memory control circuit 13.

Figure 10:
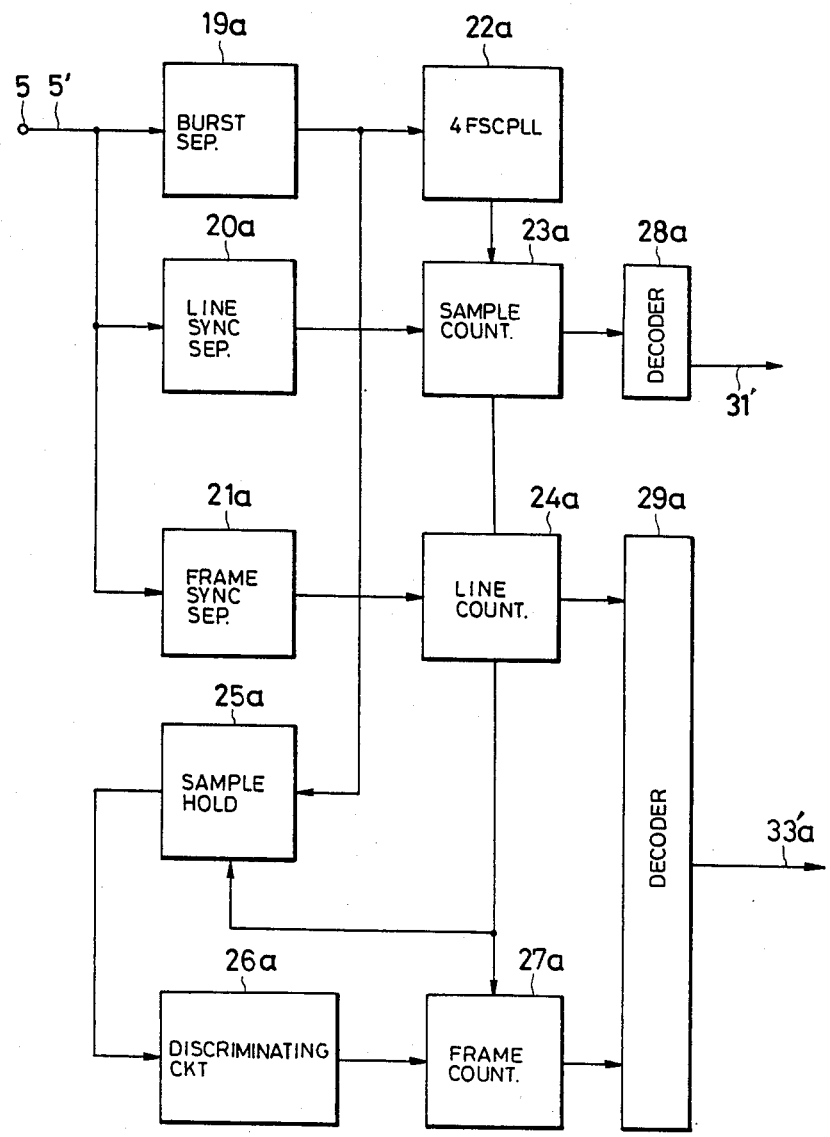
FIG. 10 is a block diagram of the other sync separator/timing generator used in the first embodiment of FIG. 1.

A reading out of the digital signal from the memory 14 is performed in accordance with a timing obtained from a sync separator/timing generator circuit 16. The block diagram of the sync separator/timing generator 16 is illustrated at FIG. 10. The sync separator/timing generator 16 generally comprises a burst separator circuit 19a, a line sync separator circuit 20a, a frame sync separator circuit 21a, a 4Fsc-PLL circuit 22a, a sample count circuit 23a, a line count circuit 24a, a sample and hold circuit 25a, a discriminating circuit 26a, a frame count circuit 27a, and decoders 28a, and 29a. FIG. 10 has the same structure as FIG. 2 except the following point. The signal 31' in FIG. 2 is not used in FIG. 10, and a signal 31' is outputted from the decoder 28a. Besides, the signal 32' in FIG. 2 is not required in FIG. 10. In FIG. 10, a timing signal 31' outputted from the decoder 28 is used as a timing signal of the reading out in the memory 14. The output from the memory 14 is sent to a phase relocating circuit 111 having a phase reforming circuit 15 and a sync separator and timing generator 16. The analog composite video signal 5' inputted to the terminal 5 is also inputted into the sinc separator/timing generator circuit 16 for obtaining required timing signals from burst and sync signals. In this analog composite video signal 5' includes a color burst signal, a line sync signal, and a frame signal. As described before, the digital composite video signal is read out from the memory 14 in accordance with the color burst signal, the line sync signal, and the frame signal.

Figures 11, 12:
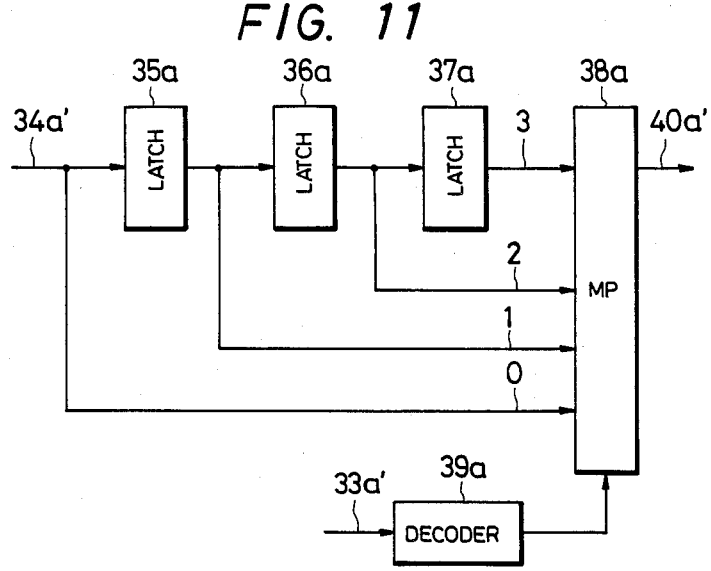
FIG. 11 is a block diagram of the phase reforming circuit used in the first embodiment of FIG. 1.
FIG. 12 is a table showing color subcarrier phasees in an NTSC digital composite video signal sampled by 4Fsc-clock pulses.

The output signal from the memory 14 is sent to the phase reforming circuit 15. The block diagram of the phase reforming circuit 15 is shown in FIG. 11. The phase reforming circuit 15 generally comprises latching circuits 35a, 36a, and 37a, a multiplexer 38a, and a decoder 39a, and has the same structure as that of FIG. 3 except that input-output relations by the NTSC system and PAL system are respectively represented in each row of "reproducing" in tables of FIGS. 4 and 5. Therefore, the operation in FIG. 11 is different from that of FIG. 3 only in the above-mentioned point.

Finally, the output digital signal from the phase reforming circuit 15 is sent to a digital-to-analog converter (DA converter) 17 for converting the output digital signal into an analog signal, and such a converted signal is sent to a terminal 18 with the same timings as the burst, line sync, and frame signals of the analog composite video signal 5' as shown in FIG. 1.

FIG. 12 is a table showing the subcarrier phase in the NTSC digital composite video signal sampled by the 4Fsc-clock. Since the NTSC system has four field sequence, only four fields 0–3 are represented by one color frame. The samples assume value of four color subcarrier phases 0°, 90°, 180°, and 270°. Adjacent lines in one frame have the same phase, and adjacent lines in one field are change by 90°. Reference numerals such as "n", "n+1", "n+2", and "n+3" show sample numbers in one digital active line. A field having line numbers "m", "m+1", "m+2", and so on is different from another field having line numbers "m'", "m'+1", "m'+2", and so on due to the interlaced scanning. The relation of line numbers "m" and "m'" is given by:

$$m' = m + 262$$

The phase of each color subcarrier sample will be called "sample phase" hereinafter.

FIG. 13 is a table showing field numbers in which the sample phase is 0°. When such 0° phases samples are stored in the memory 14, if the 0° phase samples occupy the same address thereof, the color subcarrier phase in reproduced composite video signal is synchronized even when the speedy reproducing, i.e. even when samples in which the field number is different each other are included in one field. In order to obtain the above-mentioned uniformed color subcarrier phase, there are two methods A and B as shown in the table of FIG. 13. In these methods, two examples of selecting way of fields 0–3 are respectively shown by two hatched areas. The method A corresponds to the above-described method 2. In the method A, the number of recorded lines which is to be defined is changed in accordance with the field number. In the method B according to the present invention, the starting position of the digital active line is changed in accordance with the field number.

Since it is desired that the image colleration in the hatched area is high, sample colleration has to be considered. Here, the width of one line in the vertical direction is calucurated with a sample unit scale. In the NTSC system, the number of visible samples in one digital active line on the display is approximately 753, and the number of visible line in one frame on the display is approximately 486. Since the aspect ratio of a raster is 3:4, the occupied space of one digital active line is $$753 \div 4 \times 3 \div 486 \approx 1.2 \text{ (samples/line)}$$

The colleration between samples in the respective hatched area in Table 6 is generally representable by larger value in either the product of the number of hatched line area arranged in the vertical direction and 1.2 or the number of hatched sample area arranged in the horizontal direction. In the case of the method A, vertical colleration is higher than horizontal colleration, and the value of the vertical colleration is $$4 \times 1.2 = 4.8 \text{ (samples)}$$

In the case of the method B, the horizontal colleration is higher than the vertical colleration, and the value of the horizontal colleration is 3 samples. As will be understood from the above description, the colleration of the method B is higher than that of the method A, thereby obtaining desirable high-speed reproduced video signal. As a result, the quality of images on the display is improved when high-speed reproducing.

It is to be noted that the method B is performed by way of the phase delay/select circuit 8 and the phase reforming circuit 15 in accordance with the above-mentioned input-output relations shown in the tables of FIG. 4 and FIG. 5. More specifically, in the case of the method B of the table of FIG. 13, when recording, if the field number is 0 or 1, the output signal from the phase delay/select circuit 8 is delayed by two sample time period, and if the field number is 2 or 3, the output signal is not delayed. In the vertical direction of the display, the fields 0 and 2 and fields 1 and 3 are not uniformed for the interlaced scanning. Therefore, the above-mentioned method 2 is applied to the present invention. As a result, the method B is achieved with a circuit such as shown in FIG. 3 if decoding values are determined as shown in the table of FIG. 4.

When reproducing, if the field number is 0 or 1, the output signal from the phase reforming circuit 15 is not delayed, and if the field number is 2 or 3, the output signal is delay by two sample time period. Therefore, the reproduced composite video signal is recovered from the recorded sync blocks.

Next, the subcarrier phase in the PAL digital composite video signal sampled by the 4Fsc-clock is shown in table of FIG. 14 in the similar manner to the table of FIG. 12. Since the PAL system has eight field sequence, only eight fields 0–7 are represented by one color frame. The relation of line numbers "m" and "m'" is given by:

$$m' = m + 313$$

FIG. 15 is a table showing field numbers in which the sample phase is 0° in the similar manner to the table of FIG. 13. In the case of the PAL system, four examples of selecting way of fields 0–7 are respectively shown by four hatched areas as methods A', B', C', and D'.

In the PAL system, the number of visible samples in one digital active line on the display is approximately 922, and the number of visible line in one frame on the display is approximately 576. Since the aspect ratio of a raster is 3:4, the number of the samples of one digital active line is $$922 + 4 \times 3 \div 576 \approx 1.2 \text{ (samples/line)}$$

This value is approximately the same as the case of the NTSC system. Therefore, the colleration of the method A'–D' in the PAL system is as follows:

method A' . . . 9.6 (samples);
method B' . . . 4 (samples);
method C' . . . 4.8 (samples);
method D' . . . 7.2 (samples).

As will be seen from the above description, the colleration of the method B' is higher than that of another methods A', C', and D'. Thus, in the present invention, the method having the strongest colleration is adopted thereby obtaining desirable high-speed reproduced video signal with high resolution. In the conventional recording/reproducing apparatus, the first sample of a digital active line in every field is defined in every field. However, in the present invention, the position of the first sample of a digital active line in every field is defined in every sample, and is shifted at most two samples in the horizontal direction in the NTSC system and at most four samples in the horizontal direction in the PAL system. Therefore, the following merits of the methods B and B' are also provided. First, as described in FIGS. 24 and 25 according to the NTSC system, 251 lines are required by the method A, whereas only 250 lines are required by the method 2. Thus, the number of the lines can be reduced thereby obtaining longer time for recording on the tape. Similarly, in the PAL system, although three lines are in vain every field, such a merit is more effective. At this time, in the method B, although one digital active line length for digital processes must be largely defined because the lines are shifted in the horizontal direction, since the 768 samples are generally used for the digital processes in one digital active line, 753 samples representing the number of the visible samples can be sufficiently covered thereby. Second, in the method A, it is required that some lines are delayed. In the method B, however, it is required that some samples are delayed. Therefore, the amount of required parts can be reduced by adopting the method B, and manufacturing cost become low.

Figure 16:
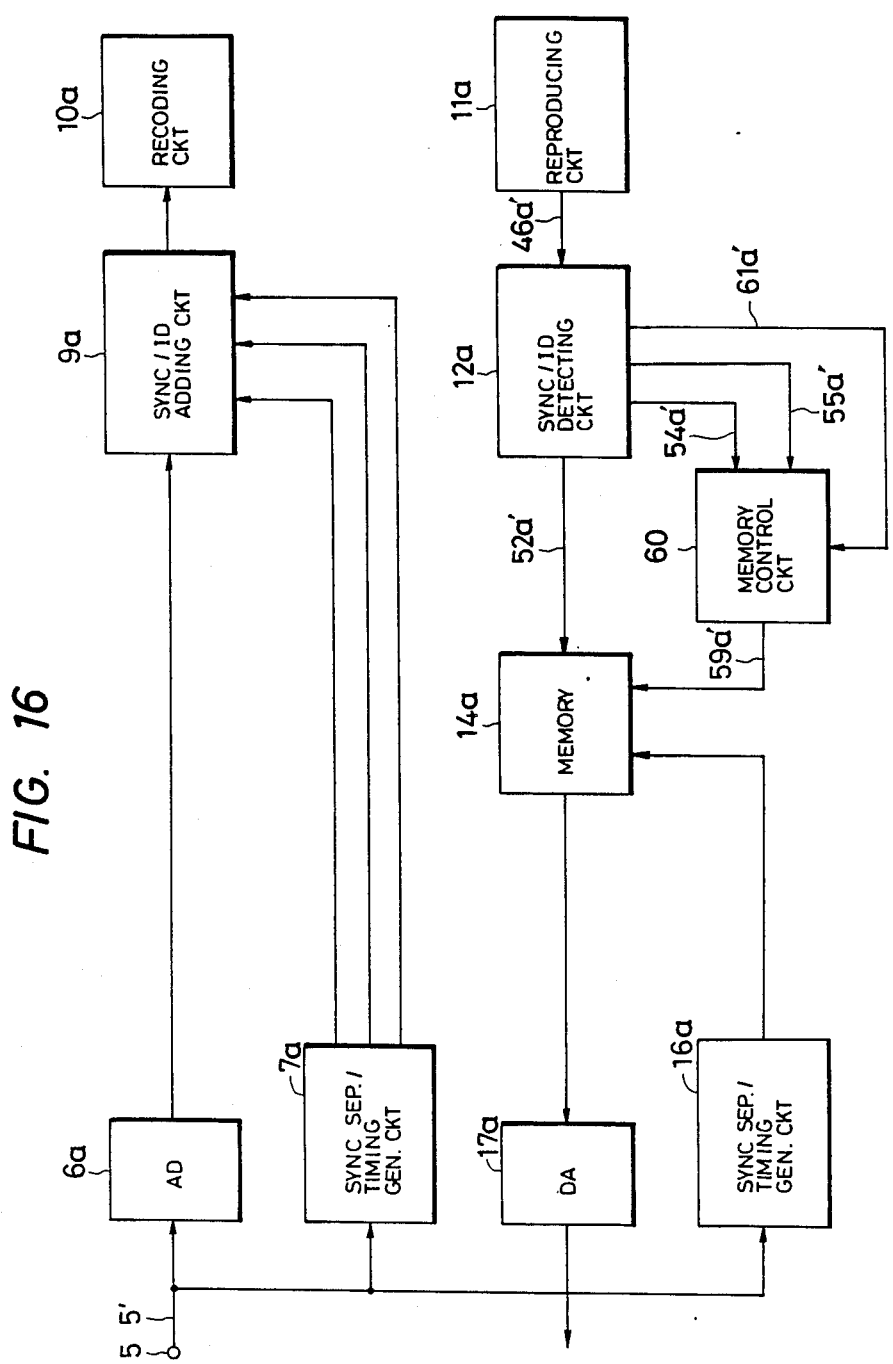
FIG. 16 shows a block diagram of a recording/reproducing apparatus for digital composite video signal according to a second embodiment of the present invention.
Figure 17:
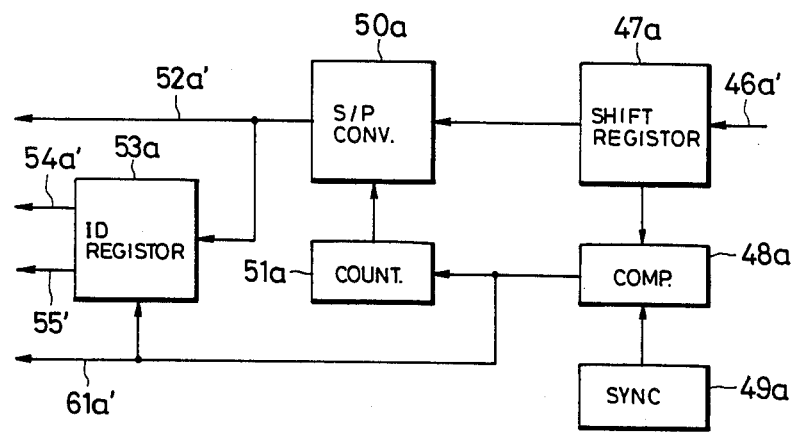
FIG. 17 is a block diagram of a sync/ID detecting circuit according to the second embodiment of FIG. 16.

Now, a second embodiment of the present invention will be described with reference to FIG. 16. FIG. 16 shows the same structure as that of FIG. 1 except the following points. A memory control circuit 60 is provided instead of the memory control circuit 13, and the phase delay/select circuit 8 and the phase reforming circuit 15 are not provided therein. A recording/reproducing circuit according to the second embodiment generally comprises an analog-to-digital converter 6a, a sync separator/timing generator circuit 7a, a sync/ID adding circuit 9a, a recording circuit 10a, a reproducing circuit 11a, a sync/ID detecting circuit 12a, a memory control circuit 60, a memory 14a, a sync separator/timing generator circuit 16a, and a digital-to-analog converter 17a. FIG. 17 is a block diagram of the sync/ID detecting circuit 12a having a shift register 47a, a comparator 48a, a sync circuit 49a, a S/P converter 50a, a counter 51a, and an ID register 53a. The sync/ID detecting circuit 12a is equal to the sync/ID detecting circuit 12 shown in FIG. 8 except that the ID register 53a outputs a field distinguishing signal 55' indicative of a field number. In the second embodiment, the top address of each block number shown in the table of FIG. 19 is determined in accordance with field numbers. FIGS. 20 and 21 are tables respectively showing the top address in the NTSC system and the same in the PAL system.

Figure 18:
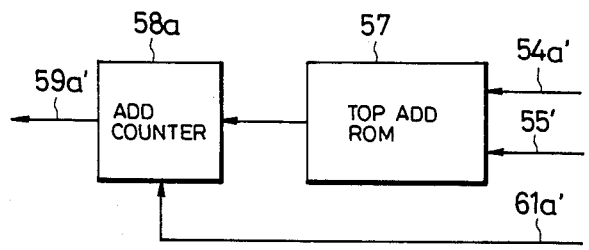
FIG. 18 is a block diagram of a memory control circuit used in the second embodiment of FIG. 16.

In the table of FIG. 20, when the block number is 0 or 1, if the field number changes 0, 1, 2, and so on, the outputted top addresses from the memory control circuit 60 are 2, 1026, 2050, and so on, for example. Therefore, the same effect as the method B can be achieved. In the case of PAL system, the same result as the method B' can be also obtained. A block diagram of the memory control circuit 60 is shown in FIG. 18. FIG. 18 is equal to FIG. 9 except that the input signal into a top address ROM 57 is not only the block number signal 54a' but the field number signal 55'. More specifically, the output from the top address ROM is dependent on the block number signal 54a' and the field number signal 55'. As will be seen from the above description, in the second embodiment, there is an advantage that the phase delay/select circuit 8 and the phase reforming circuit 15 are not required. In addition, in the first embodiment, techniques such as bit-rate reduction and shuffling can be applied.

Figures 26, 27:
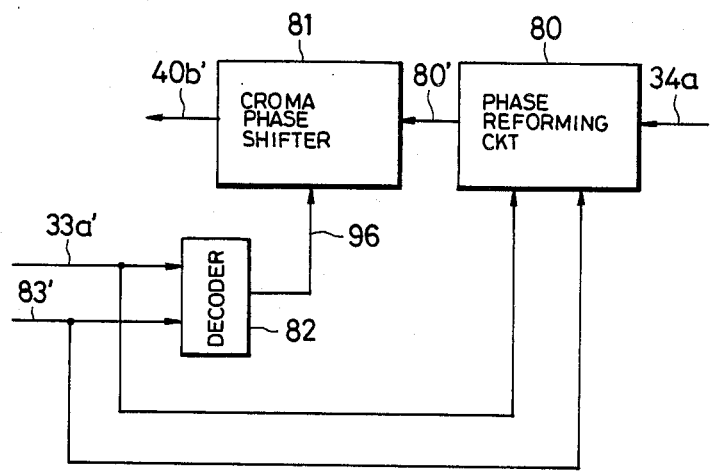
FIG. 26 is a block diagram of a phase reforming system according to another embodiment of the present invention.
FIG. 27 is a table showing an input-output relation of a decoder used in the phase reforming system.
Figures 28, 29, 30:
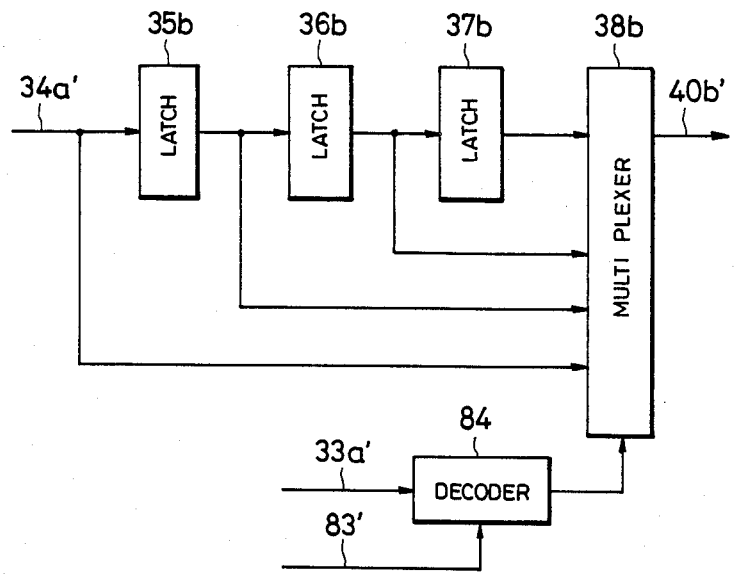
FIG. 28 is a block diagram of a phase sync circuit used in the phase reforming system of FIG. 27.
FIG. 29 is a table showing an input-output relation in the NTSC system of a decoder used in FIG. 28.
FIG. 30 is a table showing an input-output relation in the PAL system of a decoder used in FIG. 28.

Besides, when high-speed reproducing, there is another phase reforming system as well. One example of the phase reforming system is shown in FIG. 26. The system generally comprises a phase reforming circuit 80, a digital chroma phase shifter 81, and a decoder 82. It is to be noted that the following points are provided therein. At first, any input signal 34a' into the phase reforming circuit 80 is not delayed therein when high-speed reproducing. Then, such non-delayed signal 80' is inputted in the digital chroma phase shifter 81 for appropriately changing the color subcarrier phases. In the decoder 82, the field number signal 33a' from the decoder 29 of the sync separator/timing generator circuit 16 and a mode control signal 83' for distinguishing whether the present mode is a reproducing mode or not are inputted therein. The input-output relation of the decoder 82 is shown in a table of FIG. 27. When the mode control signal is 0, or "low" for example, the decoded output signal 96 is not required because the present mode is of a reproducing. The field number signal 33a' and the mode control signal is also sent to the phase sync circuit 80 shown in FIG. 28. In FIG. 28, the phase sync circuit 80 generally comprises a decoder 84, three latching circuits 35b, 36b, and 37b, and a multiplexer 38b. FIG. 28 has the same structure as that of FIG. 3 except the operation of the decoder 84. The input-output relation in the NTSC system and in the PAL system are respectively show in FIG. 29 and FIG. 30.

Figure 31:
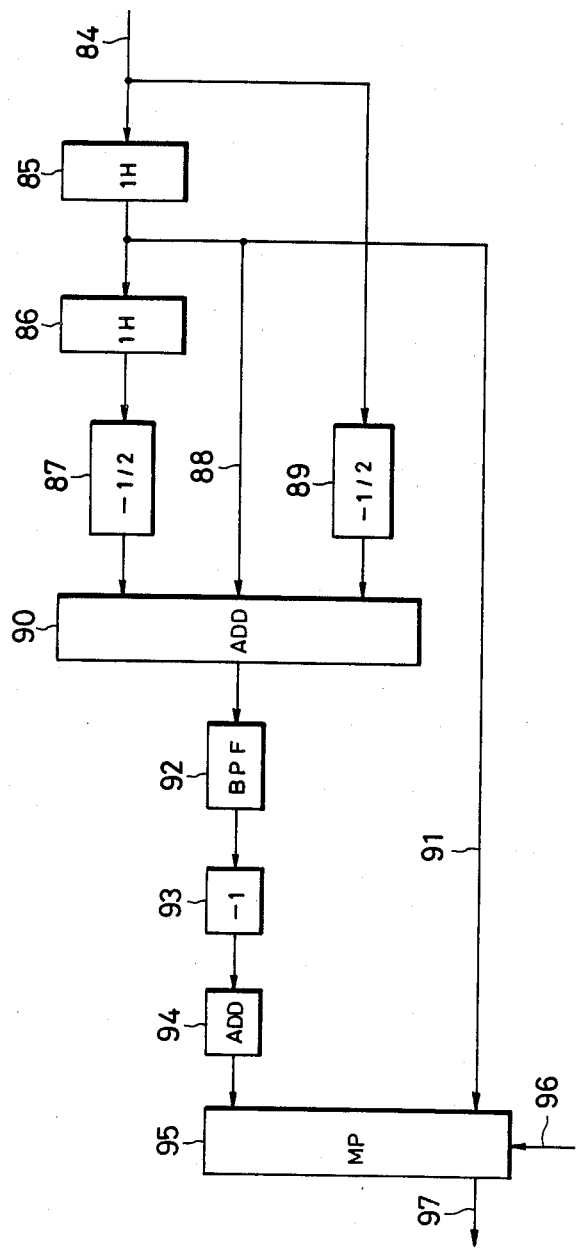
FIG. 31 is a block diagram showing a chroma phase shifter used in FIG. 26.

Next, the digital chroma phase shifter 81 is shown in FIG. 31. The chroma phase shifter 81 generally comprises two 1 H delay circuits 85 and 86, two $-\frac{1}{2}$ multipliers 87 and 89, two adders 90 and 94, a transversal-type bandpass filter (BPF) 92, a $-1$ multiplier 93, and a multiplexer 95. When reproducing, the non-delayed signal from the phase reforming circuit is inputted into the 1 H delay circuit 85 for delaying the inputted signal by 1 H time period and into the $-\frac{1}{2}$ multiplier 89, and the output signal from the 1 H delay circuit 85 is sent to another 1 H delayed circuit 86. Then the outputted from the 1 H delay circuit 86 is sent, via the $-\frac{1}{2}$ multiplier 87, to the adder 90. The outputted signal from the 1H delay circuit 85 and the output signal from the $-\frac{1}{2}$ multiplier 89 are also inputted into the adder 90. In the adder 90, these three signals are added and outputted to the BPF 92 for obtaining color signal component. The output from the BPS is sent, via the $-1$ multiplier 93, to another adder 94. The output from the 1 H delay circuit 85 is also sent to the adder 94 and the multiplexer 95. The output from the adder 94 is sent to the multiplexer 95.

Assuming that the black-and-white component of the composite video signal is Y, and that color subcarrier is C, the output from the $-\frac{1}{2}$ multiplier 87 is $$-(Y-2)2$$

the output from the $-\frac{1}{2}$ multiplier 89 is $$-(Y-2)/2$$

the output from the 1H delay circuit 85 is Y+C. Therefore, the output from the adder 90 is 2C. The output from the $-1$ multiplier 93 is 2C, and the adder 94 outputs Y−C. In the multiplexer 95, Y−C is inputted into the terminal 1, and Y+C is inputted into the terminal 0.

As a result, the output signal from the multiplexer 95 is Y+C when the field number signal 96 is 0 or 1, and is Y−C when the field number signal 96 is 2 or 3 with the input-output relation of a table of FIG. 27.

In the above-mentioned embodiments of the present invention, the samples are delayed, whereas a sample timing control signal such as the 4Fsc-clock may be delayed in every field to achieve the same effects of the present embodiments.

Figure 32:
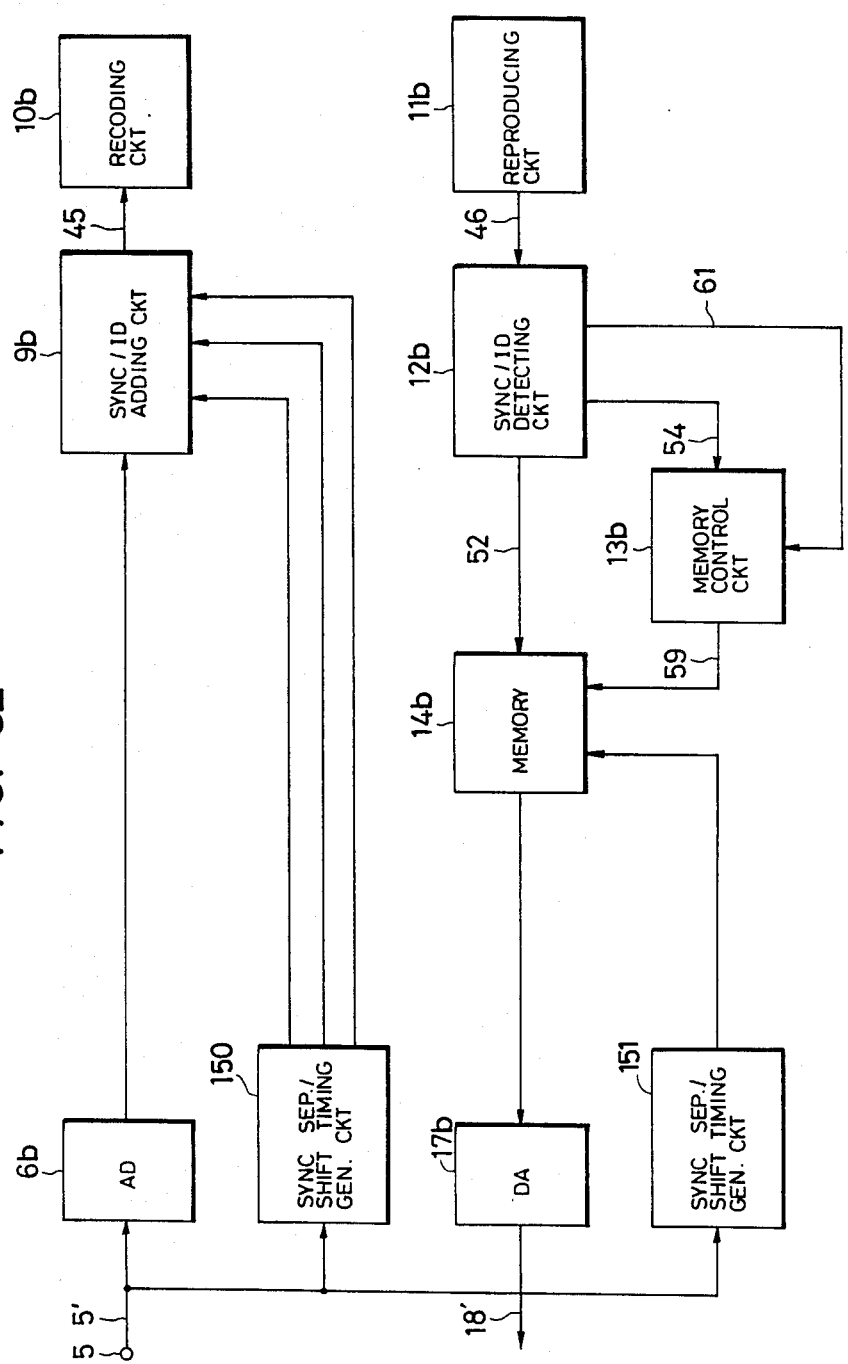
FIG. 32 is a block diagram showing a recording/reproducing apparatus for digital composite video signal according to a further embodiment of the present invention.
Figure 33:
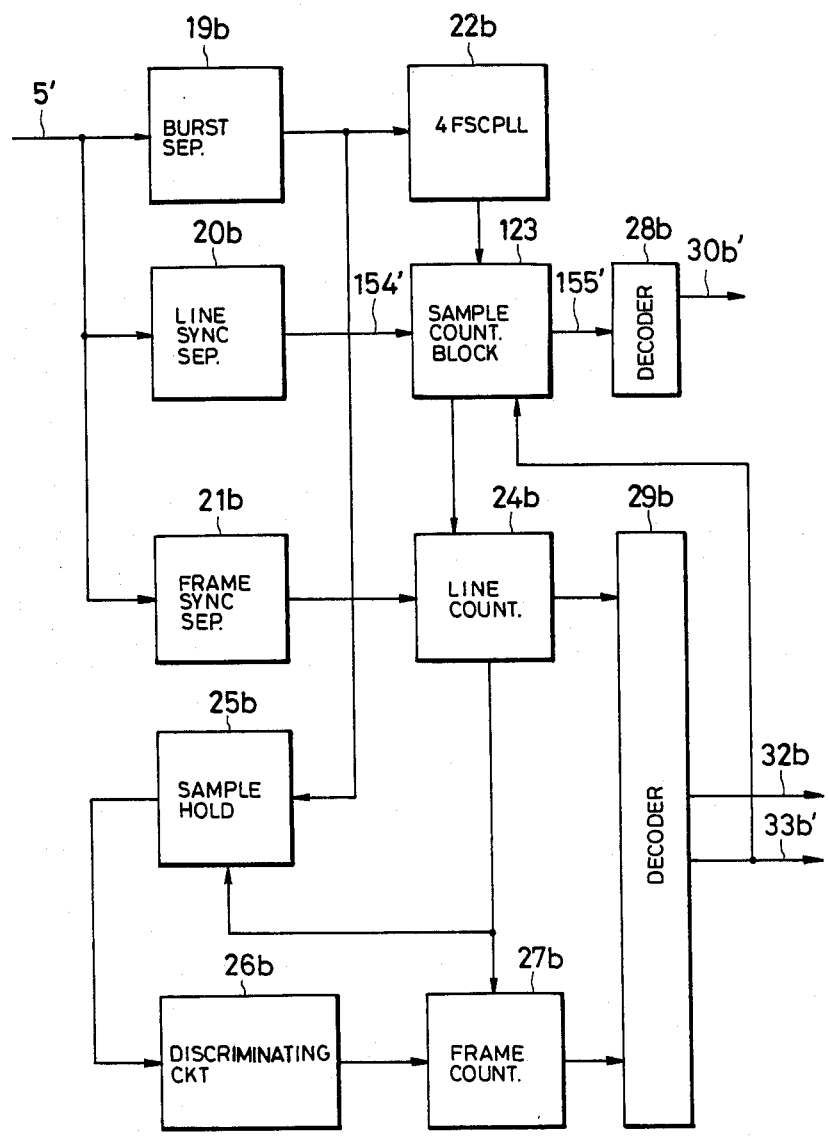
FIG. 33 is a block diagram showing one sync separator/timing generator used in FIG. 32.
Figure 34:
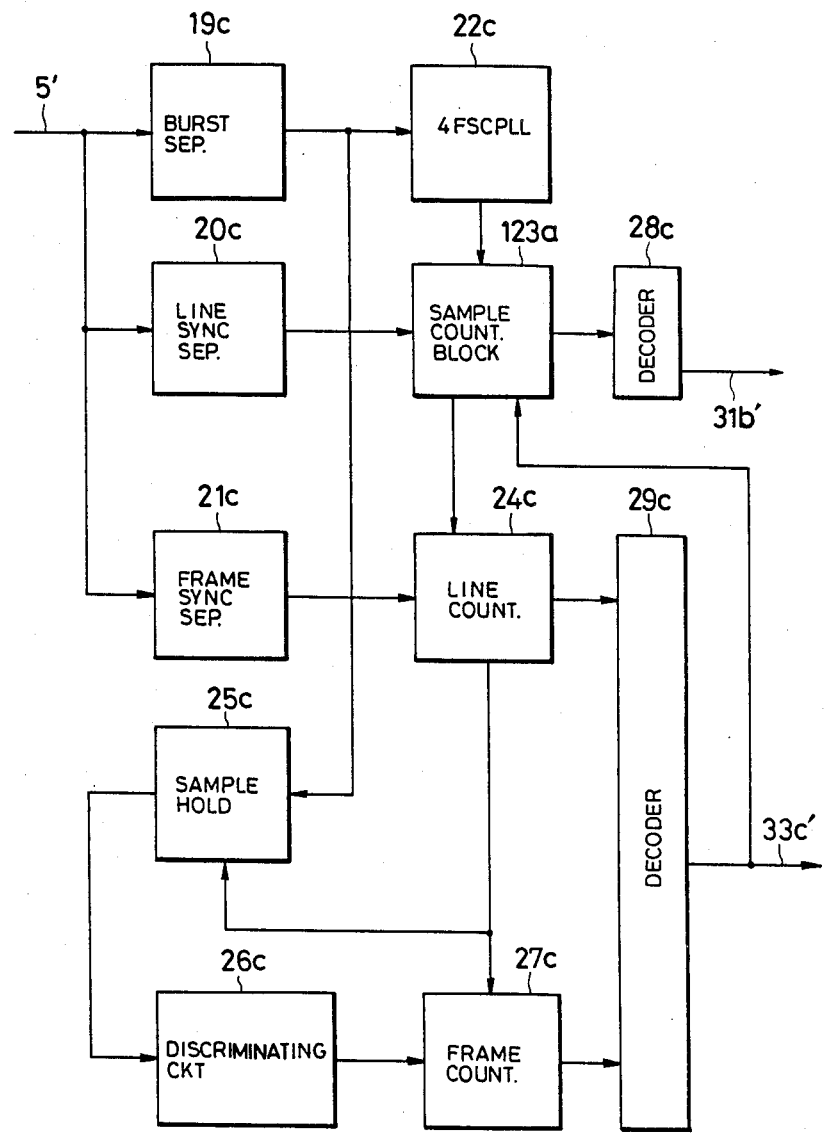
FIG. 34 is a block diagram showing the other sync separator/timing generator used in FIG. 32.
Figures 35, 36, 37:
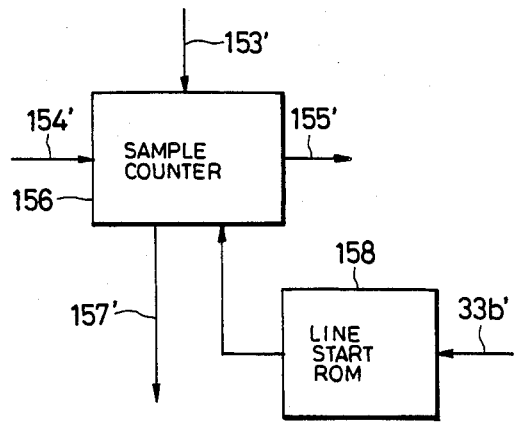
FIG. 35 is a block diagram showing a sample count block used in FIG. 33.
FIG. 36 is a table showing an input-output relation in the NTSC system of a line start ROM used in FIG. 35.
FIG. 37 is a table showing an input-output relation in the PAL system of a line start ROM used in FIG. 35.

One example of such timing signal delay technique will be described hereinbelow. FIG. 32 is a block diagram showing a recording/reproducing apparatus having the timing signal delaying technique. A recording/reproducing circuit according to this embodiment generally comprises an analog-to-digital converter 6b, a sync separator/timing generator circuit 150, a sync/ID adding circuit 9b, a recording circuit 10b, a reproducing circuit 11b, a sync/ID detecting circuit 12b, a memory control circuit 13b, a memory 14b, a sync separator/timing generator circuit 151, and a digital-to-analog converter 17b. The structure shown in FIG. 32 has the same structure of the second embodiment of FIG. 16 except that a sync separator/timing generator circuit 150 and a sync separator/timing generator circuit 150 are respectively provided instead of the sync separator/timing generator circuits 7a and 16a. A block diagram of the sync separator/timing generator circuit 150 is shown in FIG. 33, and a block diagram of the sync separator/timing generator circuit 151 is shown in FIG. 34. The sync separator/timing generator 150 generally comprises a burst separator circuit 19b, a line sync separator circuit 20b, a frame sync separator circuit 21b, a 4Fsc-PLL circuit 22b, a sample count circuit 123, a line count circuit 24b, a sample and hold circuit 25b, a discriminating circuit 26b, a frame count circuit 27b, and decoders 28b and 29b. The sync separator/timing generator 151 generally comprises a burst separator circuit 19c, a line sync separator circuit 20c, a frame sync separator circuit 21c, a 4Fsc-PLL circuit 22c, a sample count circuit 123c, a line count circuit 24c, a sample and hold circuit 25c, a discriminating circuit 26c, a frame count circuit 27c, and decoders 28c and 29c. The structure shown in FIGS. 33 and 34 respectively have the same structure of FIGS. 2 and 10 except that a sample count block 123 is provided thereto, and that the field number signal 33b' is applied to the sample count block 123. FIG. 35 is a block diagram of the sample count block 123. In FIG. 35, the sample count block 123 is generally comprises a sample counter 156 and a line start ROM 158. A 4Fsc-clock 153' is an output signal from the 4Fsc-PLL circuit 22b, and a line sync period signal 154' is an output signal from the line sync separator circuit 20b. A reference numeral 157' denotes an input signal to the line count circuit 24b. The output signal 155' is loaded to the decoder 28b in accordance with an output signal from the line start ROM 158 in every field. The input-output relations of the line start ROM 158 in the NTSC system and the PAL system is respectively shown in tables of FIGS. 36 and 37. The input signal of the line start ROM is a field number signal 33b. The format of the tables of FIGS. 36 and 37 respectively correspond to the tables of FIGS. 4 and 5. When recording with the NTSC system, if the field number is 0 or 1, the line start ROM 158 outputs a signal −2. In this case, the output 155' from the sample count block 123 is 0 after two clocks, whereby the timing when the signal −2 is loaded is delayed by two clocks in comparison with the timing when the signal 0 is loaded. It means that the samples are delayed by two clocks to achieve the same effect of the above-mentioned embodiments.

In addition, the period of the input signal 154' may be a field period. At this time, a field start ROM is used instead of the line start ROM 158, whereby the field start ROM outputs a desirable field in accordance with the field timing signal 33b'. Besides, the input signal 154' into the sample counter may be delayed, and the output signal 30b' from the decoder 28b may also be changed in accordance with the field number signal 33b' to obtain the same effect in the above-mentioned embodiments. When high-speed reproducing, the phase reforming system can be applied. It is to be noted that the chroma phase shifter and the timing signal delaying system can be applied to the first and second embodiments. For instance, in the case of the second embodiment, the chroma phase shifter is provided between the memory 14a and the digital-to-analog converter 17a.

The above-described embodiments are just examples of the present invention, and therefore, it will be apparent for those skilled in the art that many modifications and variations may be made without departing from the scope of the present invention.

What is claimed is:

1. A recoding/reproducing apparatus for digital composite video signal, comprising:
   (a) an analog-to-digital converter for converting a first analog composite video signal into a first digital composite video signal;
   (b) a phase sync circuit means for synchronizing color subcarrier phases in said digital composite video signal such that the position of the first sample of a digital active line in every field is shifted at most two samples in the horizontal direction in the NTSC system;
   (c) a sync/ID adding circuit means for adding a sync pattern and an ID pattern to a given group of data indicative of an output signal from said phase sync circuit means, thereby producing a sync block having said sync pattern, said ID pattern, and said given group of data;
   (d) a recording circuit means for recording said sync block on a recording medium;
   (e) a reproducing circuit means for reproducing said sync block from said recording medium;
   (f) a sync/ID detecting circuit means for detecting said sync pattern and said ID pattern included in said sync block from said reproducing means, for producing a block distinguishing signal and a block period signal, and for outputting said given group of data included in said sync block form said reproducing means;
   (g) a memory control circuit means for producing an address signal in accordance with said block distinguishing signal and said block period signal;
   (h) a memory means for storing said given group of data in accordance with said address signal, and for outputting said given group of data included in said sync block from said reproducing means;
   (i) a phase relocating circuit means for obtaining a second digital composite video signal from said given group of data from said memory means; and
   (j) a digital-to-analog converter for converting said second digital composite video signal into a second analog composite video signal.

2. A recoding/reproducing apparatus as claimed in claim 1, wherein said phase sync circuit means including a phase delay/select circuit means for producing three delayed signals each indicative of a sample of said digital composite video signal by using an output signal from said analog-to-digital converter and for outputting one of said three delayed signals.

3. A recoding/reproducing apparatus as claimed in claim 1, wherein said phase relocating circuit means including a phase reforming circuit means for producing three delayed signals each indicative of a sample of said digital composite video signal by using an output signal from said memory means and for outputting one of said three delayed signals.

4. A recoding/reproducing apparatus as claimed in claim 1, wherein said first analog composite video signal is sampled by 4Fsc-clock.

5. A recoding/reproducing apparatus as claimed in claim 1, wherein said phase relocating circuit including a chroma phase shifter.

6. A recoding/reproducing apparatus for digital composite video signal, comprising:
   (a) an analog-to-digital converter for converting a first analog composite video signal into a first digital composite video signal;
   (b) a first sync separator/timing generator circuit means for separation a sync signal, a burst signal, and a frame signal from said first analog composite video signal and for generating timing signals;
   (c) a sync/ID adding circuit means for adding a sync pattern and ID pattern to a given group of data indicative of an output signal from said analog-to-digital converter, and for producing a sync block having said sync pattern, said ID pattern, and said given group of data;
   (d) a recording circuit means for recording said sync block on a recording medium;
   (e) a reproducing circuit means for reproducing said sync block from said recording medium;
   (f) a sync/ID detecting circuit means for detecting said sync pattern and said ID pattern included in said sync block from said reproducing means, for producing a block distinguishing signal, a field distinguishing signal, and a block period signal, and for outputting said given group of data included in said sync block from said reproducing means;
   (g) a memory control circuit means for producing an address signal in accordance with said block distinguishing signal, said field distinguishing signal, and said block period signal, and for synchronizing color subcarrier phases in said digital composite video signal such that the position of the first sample of a digital active line in every field is shifted at most two sample in the horizontal direction in the NTSC system;
   (h) a memory means for storing said given group of data in accordance with said address signal, and for outputting said given group of data;
   (i) a second sync separator/timing generator circuit means for obtaining a second digital composite video signal from said given group of data from said memory means; and
   (j) a digital-to-analog converter for converting said second digital composite video signal into a second analog composite video signal.

7. A recoding/reproducing apparatus as claimed in claim 6, wherein said memory control circuit means including an address ROM corresponding to said block distinguishing signal and said field distinguishing signal for outputting a top address signal indicative of a top address in which said given group of data is to be stored therein;

8. A recoding/reproducing apparatus as claimed in claim 6, wherein said first analog composite video signal is sampled by 4Fsc-clock.

9. A recoding/reproducing apparatus as claimed in claim 6, further comprising a croma phase shifter between said memory means and said analog-to-digital converter.

10. A recoding/reproducing apparatus for digital composite video signal, comprising:
  (a) an analog-to-digital converter for converting an analog composite video signal into a digital composite video signal;
  (b) a first sync separator/timing generator circuit means for separation a sync signal, a burst signal, and a frame signal from said first analog composite video signal to generate timing signals, and for synchronizing color subcarrier phases in said digital composite video signal such that the position of the first sample of a digital active line in every field is shifted at most two samples in the horizontal direction in the NTSC system;
  (c) a sync/ID adding circuit means for adding a sync pattern and an ID pattern to a given group of data indicative of output signal from said analog-to-digital converter converter and for producing a sync block having said sync pattern, said ID pattern, and said given group of data in accordance with said timing signals from said first sync separator/timing generator circuit means;
  (d) a recording circuit means for recording said sync block on a recording medium;
  (e) a reproducing circuit means for reproducing said sync block from said recording medium;
  (f) a sync/ID detecting circuit means for detecting said sync pattern and said ID pattern included in said sync block from said reproducing means, for producing a block distinguishing signal, a field distinguishing signal, and a block period signal, and for outputting said given group of data included in said sync block from said reproducing means;
  (g) a memory control circuit means for producing an address signal in accordance with said block distinguishing signal and said block period signal;
  (h) a memory means for storing said given group of data in accordance with said address signal, and for outputting said given group of data;
  (i) a second sync separator/timing generator circuit means for obtaining a second digital composite video signal from said given group of data from said memory means; and
  (j) a digital-to-analog converter for converting said second digital composite video signal into a second analog composite video signal.

11. A recoding/reproducing apparatus as claimed in claim 10, wherein said first analog composite video signal is sampled by 4Fsc-clock.

12. A recoding/reproducing apparatus as claimed in claim 11, further comprising a croma phase shifter between said memory means and said analog-to-digital converter.

13. A recoding/reproducing apparatus for digital composite video signal, comprising:
  (a) an analog-to-digital converter for converting a first analog composite video signal into a first digital composite video signal;
  (b) a phase sync circuit means for synchronizing color subcarrier phases in said digital composite video signal such that the position of the first sample of a digital active line in every field is shifted at most four samples in the horizontal direction in the PAL system;
  (c) a sync/ID adding circuit means for adding a sync pattern and an ID pattern to a given group of data indicative of an output signal from said phase sync circuit means, thereby producing a sync block having said sync pattern, said ID pattern, and said given group of data;
  (d) a recording circuit means for recording said sync block on a recording medium;
  (e) a reproducing circuit means for reproducing said sync block from said recording medium;
  (f) a sync/ID detecting circuit means for detecting said sync pattern and said ID pattern included in said sync block from said reproducing means, for producing a block distinguishing signal and a block period signal, and for outputting said given group of data included in said sync block form said reproducing means;
  (g) a memory control circuit means for producing an address signal in accordance with said block distinguishing signal and said block period signal;
  (h) a memory means for storing said given group of data in accordance with said address signal, and for outputting said given group of data included in said sync block from said reproducing means;
  (i) a phase relocating circuit means for obtaining a second digital composite video signal from said given group of data from said memory means; and
  (j) a digital-to-analog converter for converting said second digital composite video signal into a second analog composite video signal.

14. A recoding/reproducing apparatus as claimed in claim 13, wherein said phase sync circuit means including a phase delay/select circuit means for producing three delayed signals each indicative of a sample of said digital composite video signal by using an output signal from said analog-to-digital converter and for outputting one of said three delayed signals.

15. A recoding/reproducing apparatus as claimed in claim 13, wherein said phase relocating circuit means including a phase reforming circuit means for producing three delayed signals each indicative of a sample of said digital composite video signal by using an output signal from said memory means and for outputting one of said three delayed signals.

16. A recoding/reproducing apparatus as claimed in claim 13, wherein said first analog composite video signal is sampled by 4Fsc-clock.

17. A recoding/reproducing apparatus in claimed in claim 13, wherein said phase relocating circuit including a croma phase shifter.

18. A recoding/reproducing apparatus for digital composite video signal, comprising:
  (a) an analog-to-digital converter for converting a first analog composite video signal into a first digital composite video signal;
  (b) a first sync separator/timing generator circuit means for separation a sync signal, a burst signal, and a frame signal from said first analog composite video signal and for generating timing signals'
  (c) a sync/ID adding circuit mean for adding a sync pattern and an ID pattern to a given group of data indicative of an output signal from said analog-to-digital converter, and for producing a sync block having said sync pattern, said ID pattern, and said given group of data;
  (d) a recording circuit means for recording said sync block on a recording medium;
  (e) a reproducing circuit means for reproducing said sync block from said recording medium;
  (f) a sync/ID detecting circuit means for detecting said sync pattern and said ID pattern included in said sync block from said reproducing means, for producing a block distinguishing signal, a field distinguishing signal, and a block period signal, and for outputting said given group of data included in said sync block from said reproducing means;

(g) a memory control circuit means for producing an address signal in accordance with said block distinguishing signal, said field distinguishing signal, and said block period signal, and for synchronizing color subcarrier phases in said digital composite video signal such that the position of the first sample of a digital active line in every field is shifted at most four samples in the horizontal direction in the PAL system;

(h) a memory means for storing said given group of data in accordance with said address signal, and for outputting said given group of data;

(i) a second sync separator/timing generator circuit means for obtaining a second digital composite video signal from said given group of data from said memory means; and (j) a digital-to-analog converter for converting said second digital composite video signal into a second analog composite video signal.

19. A recoding/reproducing apparatus as claimed in claim 18, wherein said memory control circuit means including an address ROM corresponding to said block distinguishing signal and said field distinguishing signals for outputting a top address signal indicative of a top address in which said given group of data is to be stored therein;

20. A recoding/reproducing apparatus as claimed in claim 18, wherein said first analog composite video signal is sampled by 4Fsc-clock.

21. A recoding/reproducing apparatus as claimed in claim 18, further comprising a croma phase shifter between said memory means and said analog-to-digital converter.

22. A recoding/reproducing apparatus for digital composite video signal, comprising:

(a) an analog-to-digital converter for converting an analog composite video signal into a digital composite video signal;

(b) a first sync separator/timing generator circuit means for separation a sync signal, a burst signal, and a frame signal from said first analog composite video signal to generate timing signals, and for synchronizing color subcarrier phases in said digital composite video signal such that the position of the first sample of a digital active line in every field is shifted at most four samples in the horizontal direction in the PAL system;

(c) a sync/ID adding circuit means for adding a sync pattern and an ID pattern to a given group of data indicative of output signal from said analog-to-digital converter converter and for producing a sync block having said sync pattern, said ID pattern, and said given group of data in accordance with said timing signals from said first sync separator/timing generator circuit means;

(d) a recording circuit means for recording said sync block on a recording medium;

(e) A reproducing circuit means for reproducing said sync block from said recording medium;

(f) a sync/ID detecting circuit means for detecting said sync pattern and said ID pattern included in said sync block from said reproducing means, for producing a block distinguishing signal, a field distinguishing signal, and a block period signal, and for outputting said given group of data included in said sync block from said reproducing means;

(g) a memory control circuit means for producing an address signal in accordance with said block distinguishing signal and said block period signal;

(h) a memory means for storing said given group of data in accordance with said address signal, and for outputting said given group of data;

(i) a second sync separator/timing generator circuit means for obtaining a second digital composite video signal from said given group of data from said memory means; and (j) a digital-to-analog converter for converting said second digital composite video signal into a second analog composite video signal.

23. A recoding/reproducing apparatus as claimed in claim 22, wherein said first analog composite video signal is sampled by 4Fsc-clock.

24. A recoding/reproducing apparatus as claimed in claim 22, further comprising a croma phase shifter between said memory means and said analog-to-digital converter.

* * * * *